United States Patent [19]

Irie et al.

[11] Patent Number: 5,098,269
[45] Date of Patent: Mar. 24, 1992

[54] CENTER MECHANISM FOR A TIRE VULCANIZING MACHINE

[75] Inventors: Nobuhiko Irie; Hideaki Katayama; Masami Kawasaki, all of Nagasaki, Japan

[73] Assignee: Mitsubishi Jukogyo Kabushiki Kaisha, Tokyo, Japan

[21] Appl. No.: 693,596

[22] Filed: Apr. 30, 1991

[30] Foreign Application Priority Data

May 1, 1990 [JP] Japan .................................. 2-111746

[51] Int. Cl.⁵ ............................................. B29C 35/02
[52] U.S. Cl. ......................................... 425/52; 425/58; 425/400
[58] Field of Search ....................... 425/38, 48, 49, 52, 425/58, 51, 400

[56] References Cited

U.S. PATENT DOCUMENTS

| 2,559,118 | 7/1951 | Frank | 425/48 |
| 3,396,221 | 8/1968 | Balle et al. | 425/52 |
| 3,790,656 | 2/1974 | Getz | 425/38 |
| 3,846,058 | 11/1974 | Yoshida et al. | 425/38 |

*Primary Examiner*—Willard Hoag
*Attorney, Agent, or Firm*—Wenderoth, Lind & Ponack

[57] ABSTRACT

A center mechanism for a tire mold comprising a mushroom-shaped bladder, a clamp ring for clamping a lower opening edge of the bladder, a post cylinder for extending and contracting a height of the bladder, a movable stopper for receiving a depressing force against the clamp ring which is generated by heating medium introduced into the bladder upon vulcanizing a tire, and a bladder elevator cylinder for elevating and lowering the clamp ring upon loading and unloading a tire.

4 Claims, 3 Drawing Sheets

CENTER MECHANISM FOR A TIRE VULCANIZING MACHINE

BACKGROUND OF THE INVENTION

1. Field of the Invention

The present invention relates to a center mechanism for a tire vulcanizing machine, and more particularly to a center mechanism for a tire vulcanizing machine of the type in which a bladder is stretched upon the loading and unloading a tire.

2. Description of the Prior Art

As a bladder to be mounted in an automatic tire vulcanizing machine, generally classified, two types of bladders having a cylindrical shape and a mushroom shape, respectively, have been known, and normally the following two types of operation methods have been practically used:

(1) One is a method of housing a bladder by twice folding and drawing it into a housing cylinder upon loading and unloading a tire as disclosed, for instance, in Laid-Open Japanese Patent Specification No. 51-17282 (1976), and according to this method, regardless of whether it is a mushroom-shaped bladder or a cylindrical bladder, a bladder having a smaller upper opening diameter than a lower opening diameter can be mounted for use.

(2) The other is a method of only stretching of a bladder upon loading and unloading a tire as disclosed, for instance, in Laid-Open Japanese Patent Specification No. 57-399040 (1982), and according to this method, solely mounting and use of a cylindrical bladder is contempated.

Furthermore, a method of housing a bladder by drawing it into a housing cylinder while keeping it stretched, has been proposed as a third method, but it involves structural problems (see the subsequent description), and it has not yet been practically used in general.

The above-described operation methods in the prior art involved the following problems. That is, especially in the case of vulcanizing a radial tire, in view of uniformity of a tire it is desirable to use a bladder having an outer shape close to an inner shape of a vulcanized tire, and hence the use of a mushroom-shaped bladder is abruptly increasing, but according to the above-described method (1), as a result of the popularity of radial tires, an inner diameter of a tire, that is, an outer diameter of a bladder has become large as compared to a bead diameter, and there occurred a problem in that a life of a bladder became short in relation to an allowable housing cross-sectional area of a housing cylinder.

Also, according to the above-described method (2), when a green tire is to be inserted, in the case of a radial tire or the like, upon contracting a height of a bladder it is necessary to introduce shaping steam into the bladder and to guide the bladder with a loader shoe and the like, because the bladder would be twisted if the inside of the bladder is held at vacuum, and therefore, the method (2) involves problems in that a bladder is liable to have its vertical symmetry lost due to an initial period of creep, also that upon taking out a vulcanized tire, due to its positional relationship to an upper clamp ring for a bladder, an internal grip type unloader cannot be used, but a forklift type unloader or an external grip type unloader is necessitated, hence a cycle time is prolonged and in some cases even a carry-out fault would arise.

Furthermore, according to the above-described third method, while the above-mentioned problems of the method (2) are to be resolved theoretically if provision is made such that upon loading and unloading a tire, an upper clamp ring of a bladder may be lowered to a position below the upper bead of the tire, in practical use it becoms impossible to bear a depressing force of a lower clamp ring of a bladder during vulcanization of a tire via a lower bead ring, hence a stopper would be additionally provided, but there still remain problems that in view of an available space it is difficult to insure a mechanical strength, and that a pit for installing a tire vulcanizing machine becomes extremely deep.

SUMMARY OF THE INVENTION

The present invention has been proposed in view of the above-described problems in the prior art, and it is one object of the present invention to provide a center mechanism for a tire vulcanizing machine, which can perform vulcanization of a tire with high precision, and which can resolve the above-mentioned problems in the prior art relating to bladder life, cycle time and the depth of a pit for installing a vulcanizing machine.

According to the present invention, the above-mentioned object is achieved on the basis of the recognization that a diameter of a top grip metal for fixture a mushroom-shaped bladder can be made small.

According to one feature of the present invention, there is provided a center mechanism of a tire vulcanizing machine of the type in which a bladder is stretched upon a loading and unloading the tire, which comprises a mushroom-shaped bladder, a clamp ring for clamping a lower opening edge of the bladder, a post cylinder for expanding and contracting a height of the bladder, a movable stopper for receiving a depressing force exerted against the clamp ring which is generated by heating medium introduced into the bladder upon vulcanizing a tire, and a bladder elevator cylinder for elevating and lowering the clamp ring upon the loading and unloading of a tire, and in which provision is made such that when the stopper is disengaged, the top portion and the bottom portion of the bladder can be vertically moved in the opposite directions with respect to a center of a tire.

Since the center mechanism according to the present invention is constructed in the above-described manner, in operation, when a vulcanized tire is to be taken out, after the lower clamp ring has been raised a little and then the stopper has been disengaged, while the inside of the bladder is being evacuated the bladder is stretched by raising the top portion of the bladder and lowering the bottom portion thereof, and after a lower portion of the bladder has been housed in the space under a lower bead ring, the upper bead portion of the tire is internally gripped by an unloader.

When a green tire is to be inserted, the bladder is stretched and while the inside of the bladder is kept evacuated, the upper bead portion of the green tire is internally gripped by a loader and carried in as suspended thereby, thereafter the vacuum in the bladder is released, and the bladder top portion is lowered while the bladder bottom portion is raised so that the center of the bladder may come to the center of the green tire. Subsequently, after a stopper has been inserted, while primary shaping steam is being introduced into the bladder, the bladder top portion is raised and the bladder bottom portion is lowered. When the bladder top portion has reached the same level as the upper bead portion of the green tire, the rising motion is stopped, and after the loader is released from gripping and has been removed, the lowering of the upper metal mold is commenced. It is to be noted that the clamping depressing force during vulcanization of a tire is transmitted via the stopper to a main body frame of the machine.

According to the present invention, owing to the fact that a mushroom-shaped bladder for which a diameter of a top grip metal fixture can be made small, is employed and provision is made such that nearly one-half of the bladder is drawn into a housing cylinder, the problems of the center mechanism in the prior art such as the initial period of creep of a bladder and the impossibility of employing of an internal grip type unloader, can be resolved, and also a method of drawing in a bladder, which was considered to involve a problem in practical use in the case of a bladder stretch method, has been made possible to be carried out. Therefore, even with respect to a tire having such sizes that it could not be vulcanized through a method of drawing in a bladder by twice-folding the bladder, vulcanization is made possible, also, even the so-called center sweep shaping method, in which after a bladder has been inserted into a green tire, primary shaping steam is introduced into the bladder as one of characteristics of that method, becomes possible to be employed, and therefore, great improvements in quality of a tire as well as shortening of a cycle time have been achieved.

The above-mentioned and other objects, features and advantages of the present invention will become more apparent by referring to the following description of one preferred embodiment of the present invention taken in conjunction with the accompanying drawings.

DETAILED DESCRIPTION OF THE PREFERRED EMBODIMENT

Figure 1:
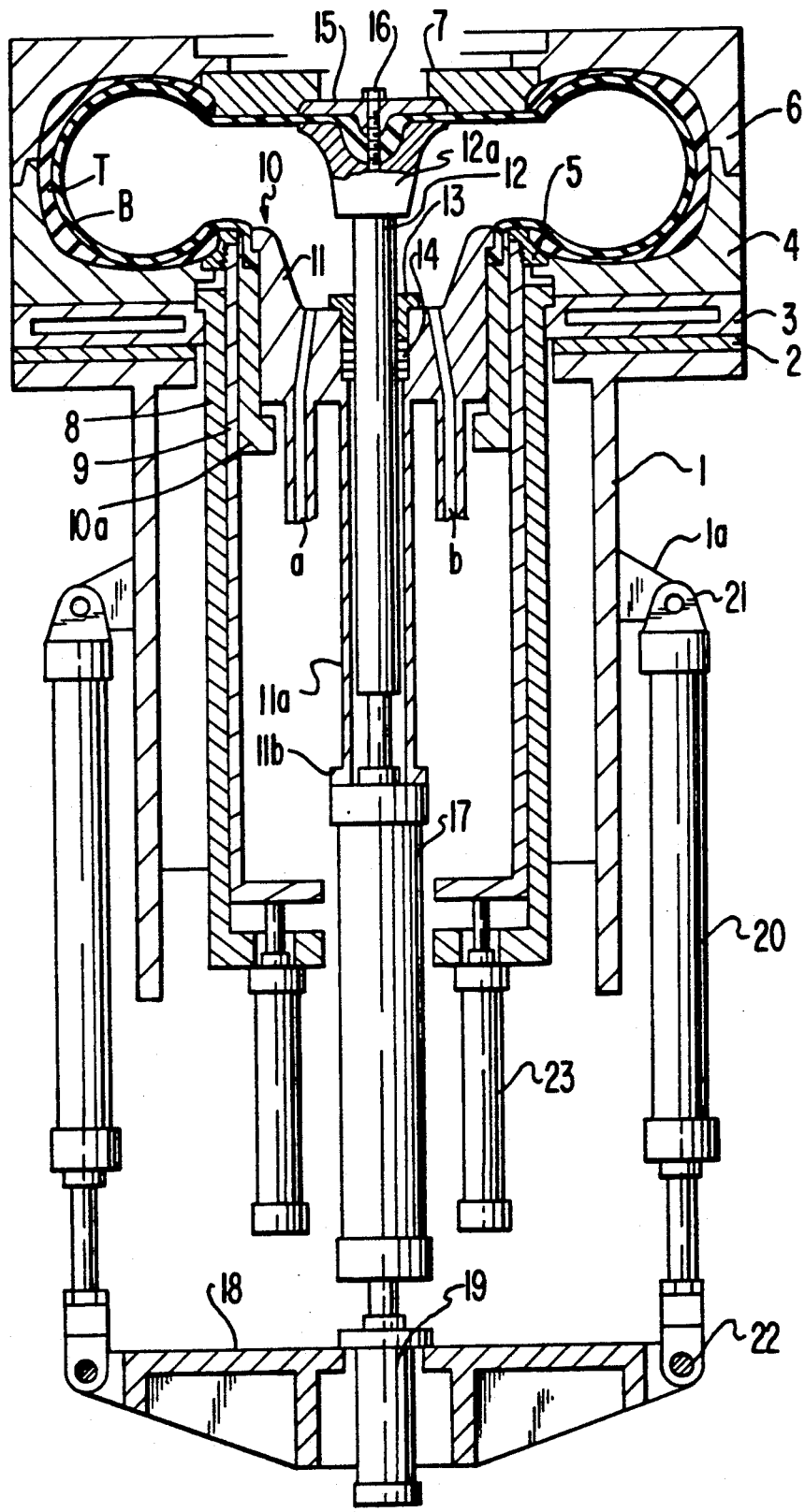
FIG. 1 is a vertical cross-sectional view showing one preferred embodiment of the present invention.

Now a center mechanism for a tire vulcanizing machine according to the present invention will be described in greater detail in connection to one preferred embodiment illustrated in FIGS. 1 to 4. In these figures, reference numeral 1 designates a base, and on the upper surface of the base 1 is fixedly secured a lower heating plate 3 via a heat insulator plate 2 by means of bolts or the like (not shown). On the upper surface of the lower heating plate 3 is fixedly secured a lower metal mold 4 by means of bolts or the like (not shown), and to the lower metal mold 4 is fitted a lower bead ring 5. Also, an upper metal mold 6 adapted to be fitted to the lower metal mold 4 is assembled with an upper metal mold elevator mechanism which is omitted from illustration, by well-known means, and to the inside of the upper metal mold 6 is fastened an upper bead ring 7 by means of bolts.

Reference numeral 8 designates an outer cylinder, whose outer circumferential upper flange portion is engaged with an upper portion of an inner surface of the lower heating plate 3, and an inner cylinder 9 is inserted in the outer cylinder 8 so as to be slidable along the inner circumferential surface of the latter. At the upper end portion of the inner cylinder 9 is fixedly secured the lower bead ring 5 by well-know means such as threads, along the inner circumferential surface of the inner cylinder 9 is slidably inserted a lower ring 10a forming one part of a clamp ring 10 which grips a lower opening edge of a bladder B, furthermore along the inner circumferential surface of the lower ring 10a is slidably inserted an upper ring 11 which forms the other part of the clamp ring 10, and the lower opening edge of the above-mentioned bladder B is gripped or released as a result of relative sliding movements of the respective rings 10a and 11. The upper ring 11 is provided with holes a and b for feeding and discharging heating medium into and from the bladder B, the lower portions of the upper ring with holes each having the shape of a pipe, and to the bottom of them are connected pipes not shown. In addition, in an inner hole of the upper ring 11 is slidably and air-tightly inserted a post 12 via a packing 14 and a packing holder 13, and a rod of a post cylinder 17, fastened by bolts to a flange 11b provided at the bottom of a lower pipe-shaped portion 11a of the same upper ring, is threaded to the bottom of the above-mentioned post 12. To an upper flange portion 12a of the post 12 is fixedly secured a top portion of the bladder B via a bladder holder 15 by means of a bolt 16.

A rod of a bladder clamp cylinder 19 fastened by bolts to an arm 18 is threaded to the bottom of the above-described post cylinder 17, and this arm 18 is connected via bladder elevator cylinders 20, pins 21 and 22 to brackets 1a fixedly secured to the base 1.

Figure 2:
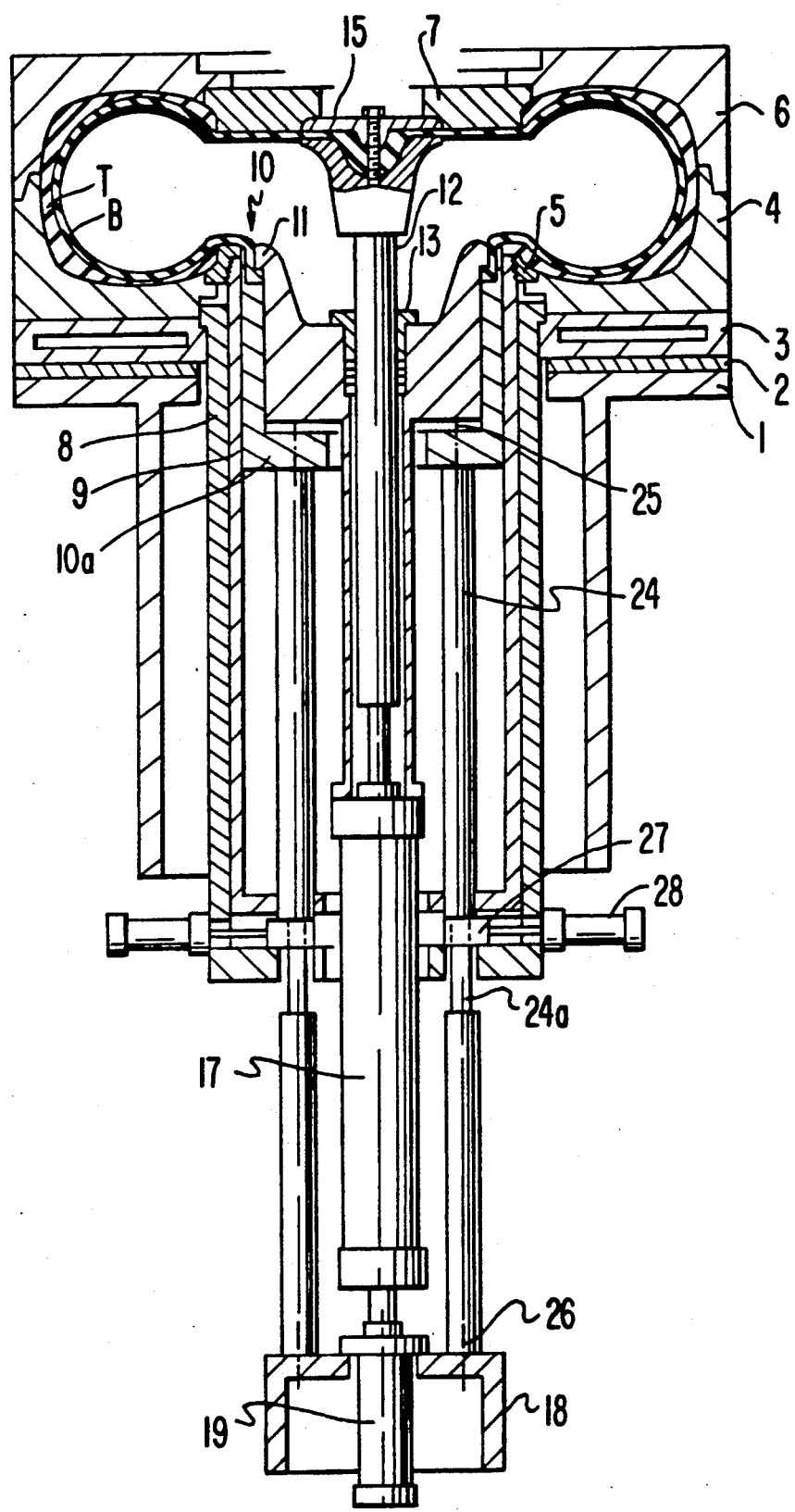
FIG. 2 is another vertical cross-sectional view of the same preferred embodiment taken along a vertical plane perpendicular to the plane of FIG. 1.
Figure 3:
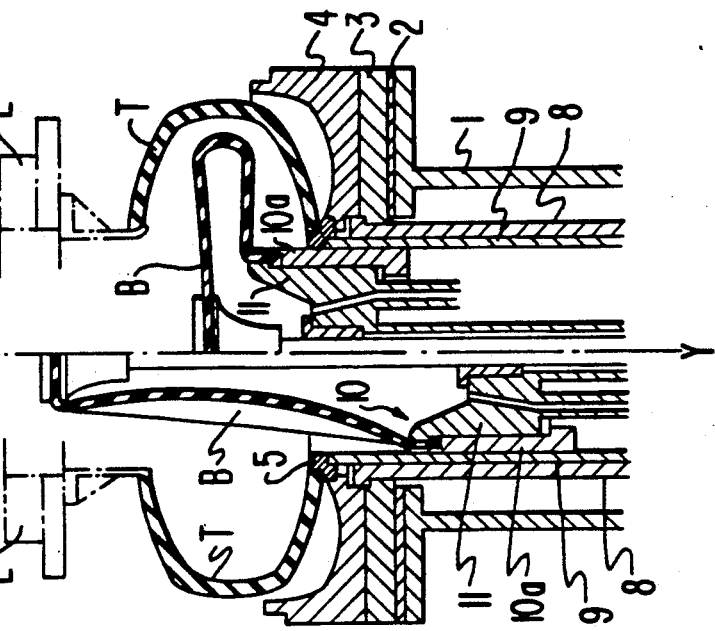
FIG. 3 is a partial cross-section view showing two different states midway of the taking out a vulcanized tire on the left hand and on the right hand, respectively, of line X—X.

In addition, as shown in FIG. 2, a top end surface of a guide shaft 24 having a smaller diameter portion 24a at the middle and slidably inserted in a hole formed in a bottom plate of the inner cylinder 9, is fastened by bolts to a lower surface of the lower ring 10a, while a bottom end surface of the guide shaft 24 is fastened by bolts to an upper surface of the arm 18, a rod of a stopper cylinder 28 fastened by bolts to the outer cylinder 8 is screwed to a U-shaped stopper 27 which is assembled slidably along the upper surface of the bottom plate of the outer cylinder 8, the stopper 27 can be inserted when the smaller diameter portion 24a of the above-described guide shaft 24 is positioned at the level corresponding to the stopper 27, and when the stopper 27 has been inserted, the stopper 27 is engaged with the lower surface of the upper larger diameter portion of the guide shaft 24 to inhibit the lowering of the guide shaft 24, but when the stopper 27 has been drawn out, the smaller diameter portion 24a of the guide shaft 24 can be freely lowered, passing through the level where the stopper 27 had been. It is to be noted that reference numeral 23 designates cylinders connected to the bottom end of the inner cylinder 9 for elevating and lowering the bead ring 5.

Next, operations of the above-described preferred embodiment of the present invention will be described. FIGS. 1 and 2 illustrate the state where a tire T is being vulcanized. When the vulcanizing process has been finished, at first a pressure of the heating medium within the bladder B is released, and when the pressure has been lowered sufficiently, the bladder B is peeled off from the upper bead portion of the tire T by slightly lowering the post 12 to allow the atmospheric air to enter through the peeled gap space, and then the upper metal mold 6 is raised. Subsequently, the bladder B is peeled off from the lower bead portion of the tire T by slightly raising the lower ring 10a and the upper ring 11 of the clamp ring 10 via the arm 18 and the guide shaft 24 by actuating the bladder elevator cylinders 20 (see the left side of line X—X in FIG. 3) to allow the atmospheric air to enter through the peeled gap space, and at the same time the stoppers 27 are drawn out to their standby positions by actuating the stopper cylinder 28. Next, while the inside of the bladder B is being evacuated, the top portion of the bladder B is raised by actuating the post cylinder 17, and at the same time, the clamp ring 10 is lowered by actuating the bladder elevator cylinders 20 in the reverse direction whereby the bladder B is stretched and the lower portion of the bladder B is drawn into the inner cylinder 9 and housed therein. When the stretching of the bladder B has been finished, a well-known internal grip type unloader U is lowered (see the right side of line X—X in FIG. 3) to make it internally grip the upper bead portion of the tire T, thereafter the lower bead ring 5 is raised and the tire T is pulled off from the lower metal mold 4 by actuating the bead lift cylinders 23, at the same time the unloader U is raised, the tire T is hung to the outside of the machine, and then take-out of the vulcanized tire T is finished. During this period, the bead lift cylinders 23 are actuated in the reverse direction to lower the lower bead ring 5 and restore it to its original position.

Figure 4:
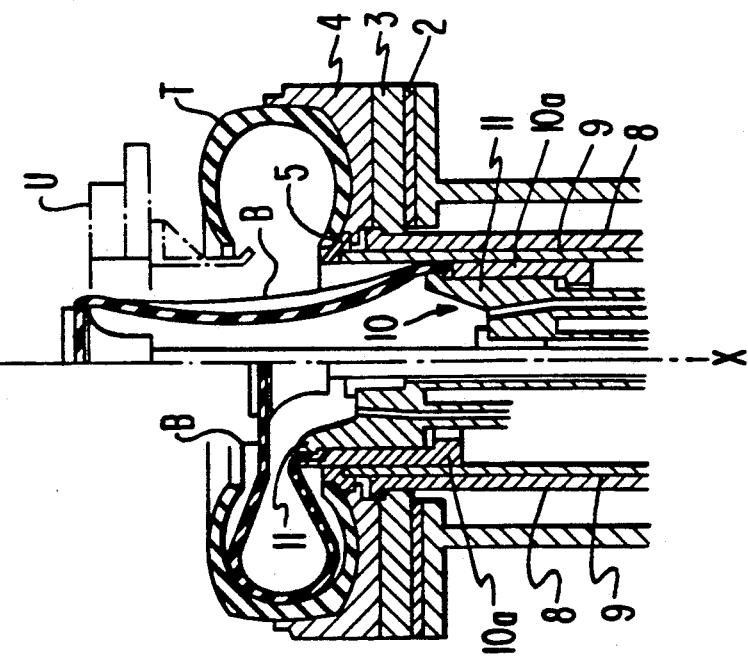
FIG. 4 is another partial cross-sectional view showing two different states midway of the carrying in of a green tire on the left hand and on the right hand, respectively, of line Y—Y.

After the lowering of the lower bead ring 5 and the hanging-out of the vulcanized tire T have been finished, a hanging-in of a green tire T to be vlucanized next having its upper bead portion internally gripped by a well-known internal grip type loader L, is carried out (see the left side of line Y—Y in FIG. 4). When the hanging-in has been finished, for the purpose of preventing the bladder B from twisting, the evacuation of the inside of the bladder B is stopped, then while feeding steam at a small pressure, after the top portion of the bladder B has been lowered or simultaneously with the lowering, the clamp ring 10 is raised to make the center of the bladder B coincide with the center of the green tire T (see the right side of line Y—Y in FIG. 4). When the center of the bladder B has reached the coincident position, the above-mentioned vertical movements are once stopped and the stoppers 27 are inserted by actuating the stopper cylinders 28. Then, while primary shaping steam is being fed into the bladder B, on the contrary, the top portion of the bladder B is raised and the clamp ring 10 is lowered, and when the clamp ring 10 has reached a predetermined position, that is, has reached the position where the guide shafts 24 are engaged with the stoppers 27 and stopped and when the top portion of the bladder B has also reached the level of the upper bead of the tire T, the above-mentioned vertical movements are stopped, thereafter the green tire T is released, and then the vacant loader is returned to its standby position. Then the above-mentioned return operation has been finished, the upper metal mold 6 is lowered and a normal shaping and vulcanizing step of the process commences.

It is to be noted that the force of depressing the upper ring 11, generated by the heating medium at a high temperature and a high pressure introduced into the bladder during vulcanization of a tire, is transmitted to the base 1 via the lower ring 10a, the guide shafts 24, the stoppers 27, the outer cylinder 8, the lower heating plate 3 and the heat insulator plate 2.

In addition, when the bladder B is to be replaced, if the bolt 16 is removed and the upper ring 11 is raised with respect to the lower ring 10a by actuating the bladder clamp cylinder 19, then the bottom opening portion of the bladder B is released, and after the bladder has been replaced by a new bladder, it is only necessary to carry out an operation that is reverse to the above-described operation.

As will be apparent from the detailed description of the preferred embodiment above, according to the present invention, owing to the fact that a mushroom-shaped bladder, for which a diameter of a top grip metal fixture can be made small, is employed and provision is made such that nearly one-half of the bladder is drawn into a housing cylinder, the problems of the center mechanism in the prior art such as the initial period of creep of a bladder and the impossibility of employing an internal grip type unloader, can be resolved, and also a method of drawing in a bladder, which was considered to involve a problem in practical use in the case of a bladder stretch method, has been made possible to be carried out. Therefore, even with respect to a tire having such sizes that it could not be vulcanized through a method of drawing in a bladder by twice-folding the bladder, vulcanization is made possible, also even the so-called center sweep shaping method, in which after a bladder has been inserted into a green tire, primary shaping steam is introduced into the bladder as one of characteristics of that method, becomes possible to be employed, and therefore, great improvements in the quality of a tire as well as shortening of a cycle time, have been achieved.

While a principle of the present invention has been described above in connection with one preferred embodiment of the invention, it is intended that all matter contained in the above description and illustrated in the accompanying drawings shall be interpreted to be illustrative and not as a limitation on the scope of the invention.

What is claimed is:

1. A center mechanism of a tire vulcanizing machine of the type in which a bladder is stretched upon a loading and unloading of a tire, said center mechanism comprising a mushroom-shaped bladder, a clamp ring for clamping a lower opening edge of said bladder, a post cylinder for expanding and contracting a height of said bladder, a movable stopper for receiving a depressing force exerted against said clamp ring which is generated by heating medium introduced into said bladder upon vulcanizing a tire, and a bladder elevator cylinder for elevating and lowering said clamp ring upon loading and unloading of a tire.

2. A center mechanism of a tire vulcanizing machine as claimed in claim 1, an further comprising and inner cylinder having a bead ring fixedly secured to its upper end and where in said clamp ring is elevated and lowering within said inner cylinder.

3. A center mechanism for a tire vulcanizing machine as claimed in claim 1, wherein the clamp ring is connected to the bladder elevator cylinder via a guide shaft which is engageable with the stopper and an arm.

4. A center mechanism for a tire vulcanizing machine as claimed in claim 2, wherein the clamp ring is connected to the bladder elevator cylinder via a guide shaft which is engageable with the stopper and an arm.

* * * * *